United States Patent
Fleury

[15] 3,643,082
[45] Feb. 15, 1972

[54] VEHICLE LIGHTING SYSTEMS

[72] Inventor: Jacques Fleury, Paris, France

[73] Assignee: Societe Anonyme Automobiles Citroen, Paris, France

[22] Filed: Feb. 11, 1969

[21] Appl. No.: 798,332

[52] U.S. Cl. .................................... 240/8.25, 240/7.1 LJ
[51] Int. Cl. ...................................... B60q 1/10, B60q 1/12
[58] Field of Search ............... 240/7.1, 7.1 XR, 62 H, 8.25

[56] References Cited

UNITED STATES PATENTS

| | | | |
|---|---|---|---|
| 1,948,264 | 2/1934 | Hoag | 240/8.25 |
| 2,557,590 | 6/1951 | Beckermann et al. | 240/62.2 X |
| 3,522,423 | 8/1970 | Henry-Biabaud | 240/8.25 |
| 1,611,883 | 12/1926 | Calkins | 240/8.25 |
| 3,316,397 | 4/1967 | Yssel | 240/7.1 |
| 3,402,287 | 9/1968 | Hindman | 240/7.1 |
| 3,415,983 | 12/1968 | McGee | 240/8.25 |
| 1,524,443 | 1/1925 | McVey et al. | 240/8.25 |

FOREIGN PATENTS OR APPLICATIONS

| | | | |
|---|---|---|---|
| 153,992 | 3/1967 | Canada | 240/7.1 |
| 280,846 | 4/1966 | Australia | 240/7.1 |

Primary Examiner—Samuel S. Matthews
Assistant Examiner—Russell E. Adams, Jr.
Attorney—Arnold Robinson

[57] ABSTRACT

Pivotal headlamps are connected to a vehicle suspension system to cause the lamp beams to move to illuminate a curve in a road and a mechanical or hydraulic system is operated by the vehicle suspension to ensure that the beams remain in the same plane despite pitching movements of the vehicle.

10 Claims, 3 Drawing Figures

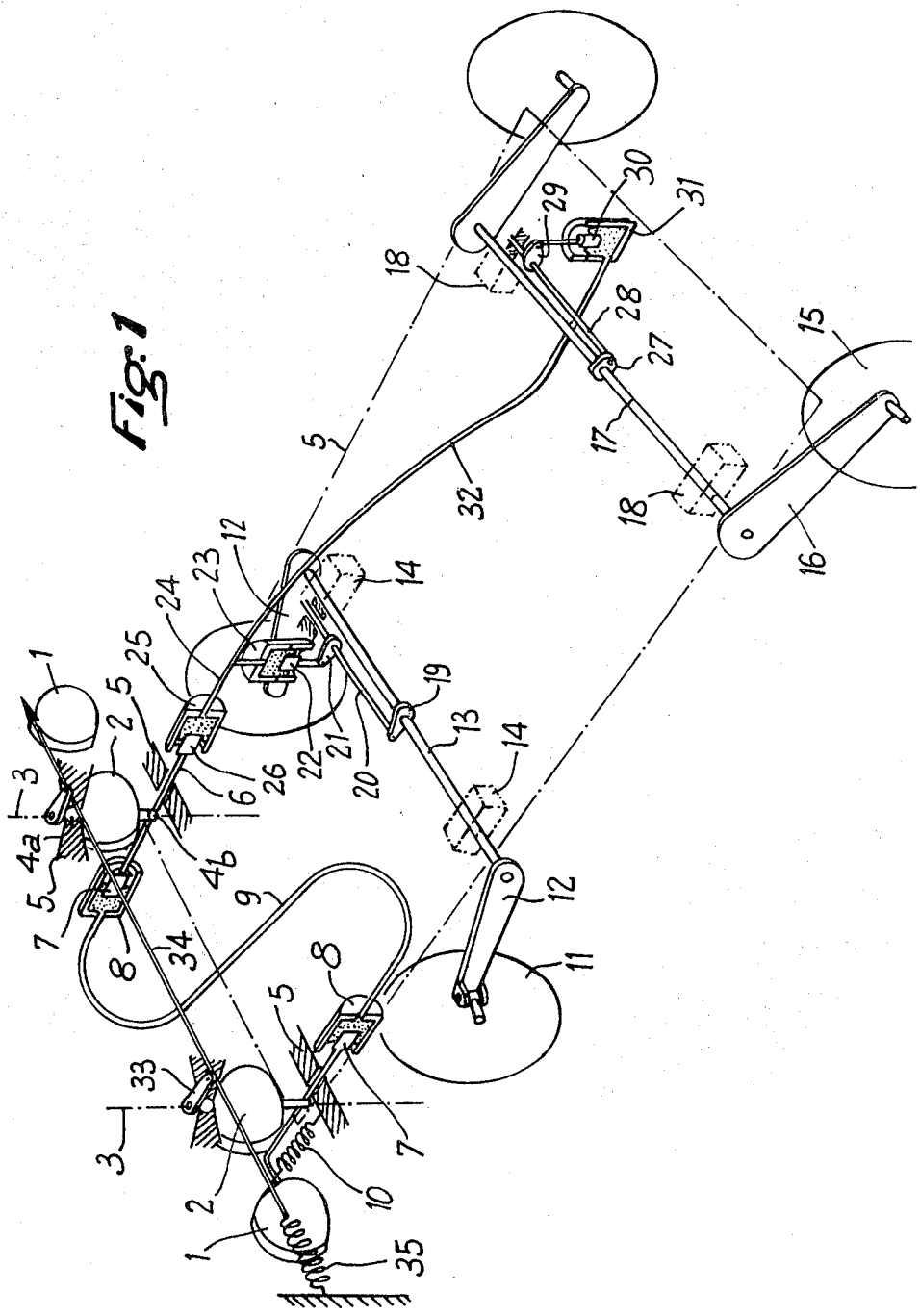

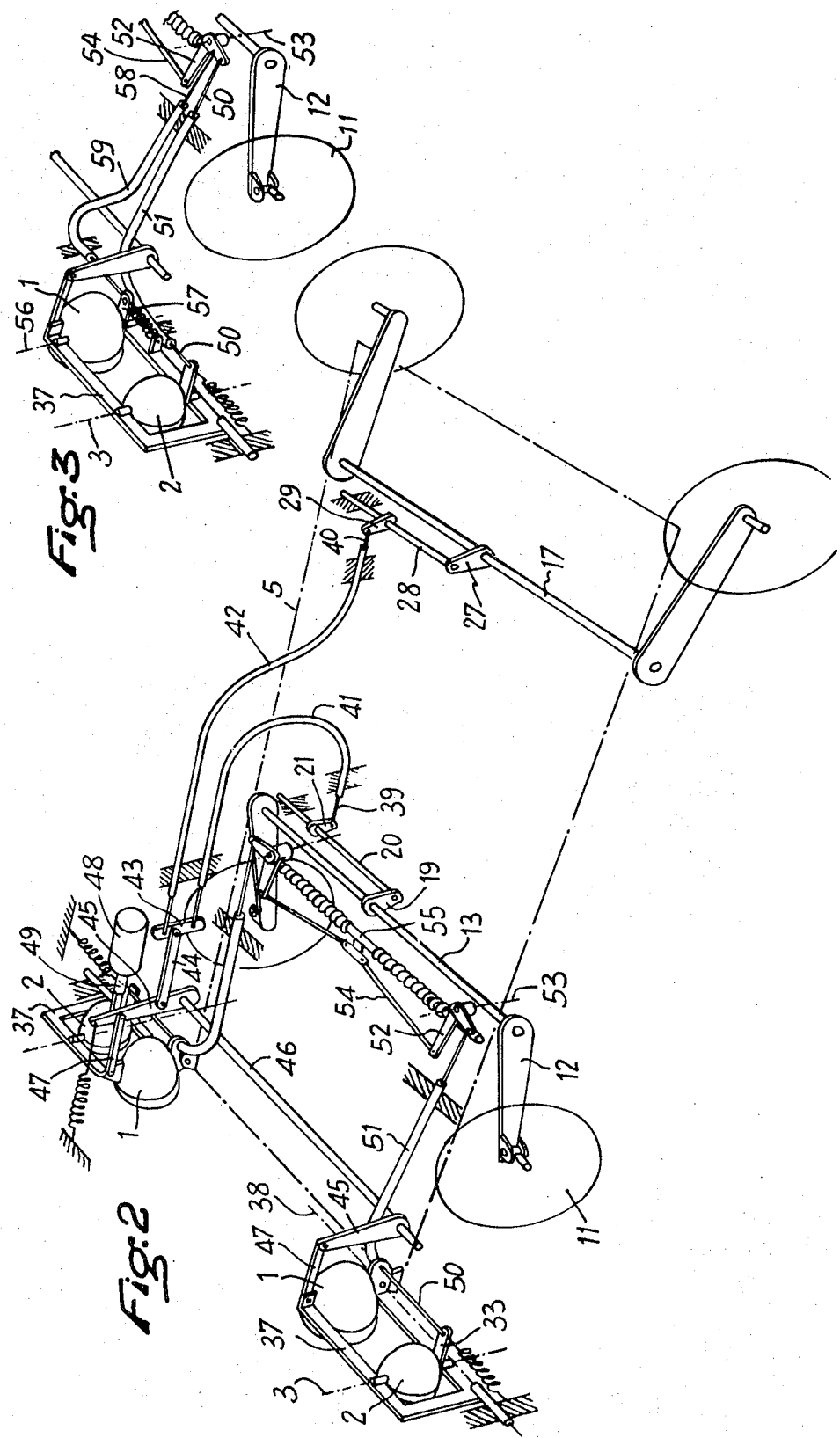

VEHICLE LIGHTING SYSTEMS

BACKGROUND OF THE INVENTION

1. Field of the Invention.

This invention relates to vehicle lighting systems.

2. Description of the Prior Art.

It has been proposed to provide long-range headlamps mounted so as to be able to pivot in relation to the chassis or bodywork of the vehicle, these lamps being linked to the steering mechanism in such a way that they pivot in whichever way the steerable wheels are turned. The pivot angle of the lamps is generally greater than that through which the wheels are turned and increases more rapidly at the commencement than at the end of the change of direction.

On a curve, these lamps illuminate the road bend, that is to say the curved stretch of road the vehicle is actually about to cover. The driver of the vehicle generally brakes before the bend, however, and then accelerates therein. This braking and acceleration cause the dynamic loading to change and the vehicle to pitch; during braking, the front of the vehicle drops and the rear rises, these movements being reversed during acceleration. The rise and fall of the front and rear of the vehicle result in an appreciable change in the angle between the optical axes of the lamps and the horizontal. Now, the long-range lamps have a highly concentrated beam, to enable them to carry a sufficient distance ahead. This means that pivoting the lamps in synchronism with the steering is not in itself sufficient to ensure the best possible illumination of the bend, this being illuminated too low down at the start of the curve and too high later.

An object of the present invention is a vehicle fitted with pivotal lamps in which this difficulty is overcome, so that, when the vehicle is steered into a bend, the lamps light up the useful portion thereof. Once the throw of the beams from the lamps is kept constant, whether the vehicle is accelerating, running at constant speed or being braked, the lamps, as they pivot during the negotiation of a bend, will illuminate this adequately.

In one particular embodiment, the lamps are linked to the front and rear axles in a manner calculated to cause them to pivot about the said substantially horizontal axis extending transversely of the vehicle, so that their optical axes are lowered with respect to the chassis when the rear of the vehicle drops and, conversely, are raised with respect to the chassis when the front of the vehicle drops, and vice versa.

In this way, when the longitudinal dynamic loading varies, the chassis becomes inclined to the horizontal. One part of the vehicle, front or rear, drops while the other rises, but the effect of the means provided is to keep the range of the lamps substantially constant.

In one advantageous embodiment, the vehicle is fitted not only with long-range lamps, but also with lamps for medium-distance or short-distance illumination, each of these being linked, like the long-range lamps, to mechanisms such as already referred to, but which cause them to pivot, in synchronism with the steering, through an angle which differs from and is in general smaller than that through which the long-range lamps pivot.

The lamps for medium-distance or short-distance illumination may be normal-type headlamps such as regulation two-filament lamps, or special regulation-type lamps that can be corrected by conventional means to provide medium-distance illumination.

BRIEF DESCRIPTION OF THE DRAWINGS

FIG. 1 is a perspective view of one embodiment;

FIG. 2 is a perspective view of a second embodiment; and

FIG. 3 is a perspective view of a detail taken from a third embodiment.

DESCRIPTION OF THE PREFERRED EMBODIMENTS

In the embodiment shown in FIG. 1, the vehicle has two regulation two-filament lamps 1, which are fixed, and two long-range lamps 2.

Each of the lamps 2 is fixed to a spindle the axis of which is indicated at 3, which lies in a substantially vertical plane extending longitudinally of the vehicle and at the same time intersecting an axial plane of the lamp. The top of the spindle 3 is mounted by a ball-and-socket joint 4a, on the vehicle chassis or other part of the vehicle structure 5. The bottom end of the spindle 3 is connected by the ball joint 4b to a short rod 6, which can slide in relation to the chassis, parallel to the fore-and-aft line of the vehicle.

Each of the rods 6 is connected at one end, the front end in the case of one lamp and the rear end in the case of the other, to a piston 7, which slides in a cylinder 8 filled with liquid. The two cylinders 8 are interconnected by a pipe 9, so that the rods 6 always move in the same direction and through the same distance, the pivot spindles 3 thus remaining parallel. A restoring spring 10 connects one of the rods 6 to the chassis, its action being to move the rod in a direction such that its piston is driven into the corresponding cylinder.

The front wheels 11 are mounted on the ends of arms 12, fitted to, and secured against rotation in relation to, an antiroll torsion bar 13, which has freedom to turn in brackets 14 (broken lines), carried by the chassis 5.

Keyed to the mid-portion of the antiroll bar 13 of the front axle is an arm 19, to the free end of which is fixed one end of resilient bar 20, the other end of which is keyed to the chassis 5.

Another arm 21 keyed to the bar 20, is linked to a piston 22, which slides within a liquid-filled cylinder 23. This cylinder 23 communicates through a pipe 24 with a second cylinder 25, the piston 26 of which is connected to one of the rods 6.

It will be apparent, therefore, that when, for example, the loading on the front of the vehicle is increased, the torsion bar 13 will pivot in its brackets 14, carrying with it the arm 19, which in turn will cause the bar 20 and hence also the arm 21 to turn. The piston 22 is thereupon driven into its cylinder 23, so that the piston 26 is moved outwards from its cylinder 25, carrying with it the rod 6 to which it is connected, and thereby altering the tilt of the spindle 3 connected to that rod, the interaction being such that the optical axis of the corresponding lamp is raised. Because of the interconnection of the two rods 6 by the cylinders 8 ad the pipe 9, the optical axis of the other lamp will also rise to the same extent.

The action is reversed if the loading on the front of the vehicle is reduced, the optical axes of both lamps being then tilted forward.

Similarly, the antiroll bar 17 of the rear axle carries at its center an arm 27, to the end of which is fixed one end of a resilient bar 28, the other end of which is keyed to the chassis 5. An arm 29, keyed to the bar 28, is linked to a piston 30 slidable in a liquid-filled cylinder 31. Contrary, however, to the action at the front of the vehicle, the mode of assembly is such that when the bar 17 is turned because of an increase in the loading on the rear of the vehicle, the piston 30 is moved outwards from its cylinder 31, which communicates through a pipe 32 with a pipe 24.

It will be clear that an increase in the loading on the rear of the vehicle will result in tilting the optical axes of the lamps 2 forward, while a reduction in the loading will raise them.

The various resilient bars have the same characteristics and the cylinders 23 and 31 are of equal volumetric capacity, so that equal variation in the static loads on the front and rear of the vehicle will make no difference to the position of the piston 26 and hence to the tilt of the lamps 2.

On the other hand, any variation in the longitudinal dynamic loading will alter the tilt of the lamps. For example, should the vehicle accelerate, its front will rise and its rear will drop, the optical axis of the lamps 2 being tilted forward in relation to the chassis; and conversely, should the vehicle be braked, the optical axes of the lamps will be raised in relation to the body of the vehicle; and they will illuminate over the same distance over the ground in both cases.

A short horizontal rod 33, is keyed to each of the lamp spindles 3. The free ends of both these rods 33 are pivoted to a single rod 34, linked to the steering rod system and acted upon by restoring spring 35. As the steering action is applied to the wheels 11, therefore, the spindles 3 will be pivoted in the same direction.

The method of linking the rod 34 to the steering rod system is immaterial, the rod may be connected, for example, to the steering repeater level, but it should preferably be such that some conventional mechanism ensures that the pivot angle of the lamps 2 is greater than the angle through which the wheels are turned and that this pivot angle increases more rapidly at the commencement than at the end of the change of direction of the wheels.

In the embodiment shown in FIG. 2, the regulation headlamps 1, instead of being fixed, tilt in vertical longitudinal planes according to variations in dynamic loading and the linkage between the axles and the various lamps is not hydraulic, but mechanical.

The spindle 3 about which each of the long-range lamps 2 pivots is carried by a frame 37, to which the corresponding regulation headlamp 1 is fixed. The frame 37 is arranged to turn, in relation to the chassis 5, about a horizontal spindle 38, which is the same for both frames and is at right angles to the vertical fore-and-aft midplane of the vehicle.

In addition, each of the arms 21 and 29 is connected by the cable 39 or 40, slidable in a respective sheath 41 or 42, to one end of a floating rocking lever 43. One end of a short rod 44, is pivoted to this rocking lever 43 at an intermediate point in the length of the latter, while its other end is articulated to an arm 45, keyed to one end of a horizontal transverse rod 46. This arm is connected by the rod 47 to one of the frames 37. The other end of the rod 46 also carries an arm 45, connected by a rod 47 to the second frame.

It will be seen that, as in the example previously described, a change in dynamic loading will result in the lamps 2 being pivoted about a transverse axis, but here the regulation headlamps pivot simultaneously.

Provision is also made for a damper 48, which acts on the arm 45 through the rod 49 and prevents the rapid and irregular rising and falling of the front and rear of the vehicle due to the nature of the road surface from causing undue movement of the lamps 1 and 2.

This damper may be of conventional design, with two chambers closed externally by a diaphragm and intercommunicating through a constricted passage, the center of both diaphragms being fixed to a rod which passes through the damper and is fixed to the rod 49 so as to follow its translational motion.

In addition, each of the arms 33 keyed to one of the spindles 3 is connected by a cable 50, slidable in the sheath 51, to a steering repeater lever 52 situated on the same side as the said arm. This lever 52, which is mounted so as to be free to turn about the pivot 53 in relation to the chassis, is connected in the conventional way by a rod 54, to the steering rack 55. Thus, the steering applied to the front wheels 11 will cause the long-range lamps 2 to pivot about their spindles 3.

In the modification shown in FIG. 3, each of the regulation-type combination lamps 1 is mounted to pivot on the frame 37 about a spindle 56. This spindle 56 is rigidly attached to the arm 57, which is connected to the steering repeater lever 52 by a cable 58 slidable in a sheath 59. In the embodiment shown, the point of attachment of the cable 58 to the lever 52 is nearer to the pivot 53 of the lever than the point of attachment of the cable 50.

Hence, when steering is applied to the wheels, the lamps 1 will pivot about their spindle 56, but their pivot angle will be smaller than that of the long-range lamps 2.

The invention should naturally not be regarded as limited to the practical embodiment here described and illustrated, but on the contrary covers all modification thereof. Thus, in particular, the vertical plane in which a spindle 3 has freedom to move might not be truly vertical, but might be at an angle of up to 10° to the vertical.

I claim:

1. In a vehicle a pair of road wheels, a steering system controlling said pair of road wheels, a first pair of headlamps, and a vehicle structure, the improvement comprising first means for mounting each lamp which include a first support pivotally mounted to the chassis of the vehicle at one end of a vertical axis through the lamp to tilt said axis relative to said vehicle by moving the second end of the axis in a plane substantially vertical and parallel to the longitudinal axis of the vehicle, and a second support mounted on said first support on which the lamp can rotate in a horizontal direction on said vertical axis, second means operated by said steering system for rotating each of said headlamps about said axis in the direction in which said steering system acts to orientate said road wheels, and third means responsive to the angle of pitch of the vehicle body for tilting the axis of each lamp in a plane substantially vertical and parallel to the longitudinal axis of the vehicle whereby the longitudinal axis of the beam of each headlamp is kept substantially constantly in a predetermined plane irrespective of any pitching motion of the vehicle.

2. In a vehicle according to claim 1, a second pair of lamps for illuminating an area closer to the vehicle than the area to be illuminated by the first said pair of lamps, each of said second pair of lamps being carried by said first means on a pivotally mounted support mounted to the chassis of the vehicle at one end of the vertical axis through the lamp to tilt said axis relative to a horizontal axis extending transversely of the vehicle, by moving the second end of the axis in a plane substantially vertical and parallel to the longitudinal axis of the vehicle, whereby the longitudinal axis of the beam of each headlamp is kept substantially constantly in a predetermined plane irrespective of any pitching motion of the vehicle.

3. In a vehicle according to claim 2, wherein the supports are further provided with other supports on which each lamp can rotate in a horizontal direction on said axis and means connecting the lamps of the second pair of the steering system, said connecting means serving to rotate the lamps in the direction in which said steering system acts to orientate the road wheels through an angle differing from the rotational angle of the first pair of lamps.

4. In a vehicle according to claim 1, in which said first support of said first means include, a first ball joint mounting one lamp of said first pair of lamps at the top of said lamp, a second ball joint mounting the other lamp of said pair of lamps at the top of said lamp, first and second control rods, a third ball joint mounting the one lamp on the first control rod at the bottom of the lamp, and a fourth ball joint mounting the other lamp on the second control rod at the bottom of the lamp, said first and said second control rods being movable by said third means in the fore-and-aft direction of the vehicle whereby to vary the orientation of the lamps.

5. In a vehicle according to claim 1, which includes a second pair of head-lamps and in which said first means comprise a support frame means carrying one lamp of each pair, said frame means being pivotally mounted to the chassis of the vehicle at one end of a vertical axis through at least one lamp, to tilt the axis of both lamps relative to said support by moving the second end of the axis of the lamps in a plane substantially vertical and parallel to the longitudinal axis of the vehicle, said frame means including at least one second support mounted thereon which can rotate at least one lamp.

6. In a vertical according to claim 5,
   a spindle,
   both said frames being mounted to pivot about said spindle.

7. A vehicle according to claim 5, wherein the lamps mounted to rotate in the frames are the lamps of the second pair is fixed to the corresponding frame.

8. A vehicle according to claim 5, wherein both of said frame means are further adapted to rotate the lamps situated on the same side of the vehicle.

9. A vehicle according to claim 2, wherein the lamps of the second pair include
   double filament bulbs.

10. In a vehicle according to claim 1, in which said third means include a torsion bar interconnecting said road wheels, and a member secured to and extending radially from the torsion bar, said member being angularly movable to actuate said third means.

* * * * *

UNITED STATES PATENT OFFICE
CERTIFICATE OF CORRECTION

Patent No. 3,643,082　　　　　　　　　　Dated February 15, 1972

Inventor(s) Jacques Fleury

It is certified that error appears in the above-identified patent and that said Letters Patent are hereby corrected as shown below:

Column 4, line 64 (line 1 of claim 6) delete "vertical" and insert --vehicle--.

Column 4, line 68 (line 2 of claim 7) before "second" insert --first pair and each of the lamps of the--.

On the cover sheet insert -- Claims priority, application France, February 16, 1968, 3462 --.

Signed and sealed this 12th day of September 1972.

(SEAL)
Attest:

EDWARD M. FLETCHER, JR.　　　　　　ROBERT GOTTSCHALK
Attesting Officer　　　　　　　　　　Commissioner of Patents